(12) United States Patent
Uesugi

(10) Patent No.: US 7,489,737 B2
(45) Date of Patent: Feb. 10, 2009

(54) DELAY ADJUSTMENT DEVICE AND METHOD, AND RADIO BASE STATION APPARATUS

(75) Inventor: Hiroyuki Uesugi, Tokyo (JP)

(73) Assignee: NEC Corporation, Tokyo (JP)

( * ) Notice: Subject to any disclaimer, the term of this patent is extended or adjusted under 35 U.S.C. 154(b) by 869 days.

(21) Appl. No.: 11/087,219

(22) Filed: Mar. 23, 2005

(65) Prior Publication Data

US 2005/0213639 A1    Sep. 29, 2005

(30) Foreign Application Priority Data

Mar. 26, 2004    (JP)    ............................. 2004-093530

(51) Int. Cl.
    H04L 27/00    (2006.01)
(52) U.S. Cl. ...................................... 375/295
(58) Field of Classification Search ................. 375/130, 375/140, 146, 295, 296; 455/403, 422.1, 455/456.1, 456.5, 39, 500, 507, 517, 522, 455/63.1, 91, 127.1; 370/464, 498, 503, 370/507, 508
See application file for complete search history.

(56) References Cited

U.S. PATENT DOCUMENTS 5,943,362 A * 8/1999 Saito ........................ 375/143
5,960,028 A * 9/1999 Okamoto et al. ............. 375/130

FOREIGN PATENT DOCUMENTS

| EP | 0 776 099 A2 | 5/1997 |
|----|--------------|--------|
| EP | 1 217 779 A1 | 6/2002 |
| JP | 9-214467 | 8/1997 |
| JP | 2002-374193 | 12/2002 |
| JP | 2003-158774 | 5/2003 |
| JP | 2003-258694 | 9/2003 |

* cited by examiner

*Primary Examiner*—Mohammad H Ghayour
*Assistant Examiner*—Vineeta S Panwalkar
(74) *Attorney, Agent, or Firm*—Scully, Scott, Murphy & Presser, P.C.

(57) ABSTRACT

A radio base station apparatus according to the invention includes an information monitoring section 2, and transmitter sections 11, 12 to 1n. Each of the transmitter sections 11 to 1n includes a delay control section 3, a data control section 4, a delay adjustment section 5, and an RF section 6. The information monitoring section 2 monitors the operation status of the data control section of each of the transmitter sections 11 to 1n. The information monitoring section 2 controls the data control section 4 according to the operation status monitored. The data control section 4 generates a multiplexed signal of a spread delay adjustment signal and a spread main signal. The multiplexed signal goes through the delay adjustment section and RF section, and is outputted via an antenna element. At the same time, the delay control section 3 compares the signal obtained by multiplexing the delay adjustment signal in the data control section 4 with a transmitting signal detected from the RF section to thereby calculate a transmission delay time.

24 Claims, 5 Drawing Sheets

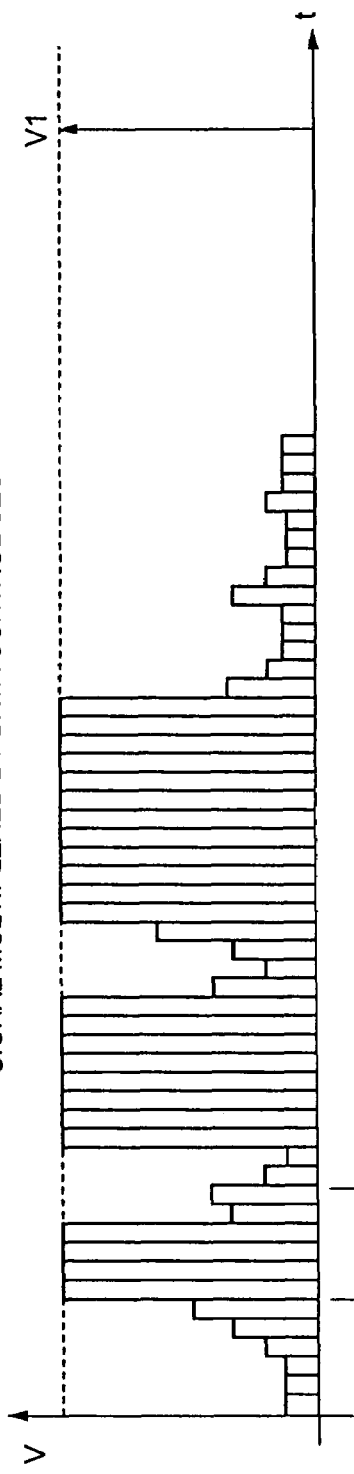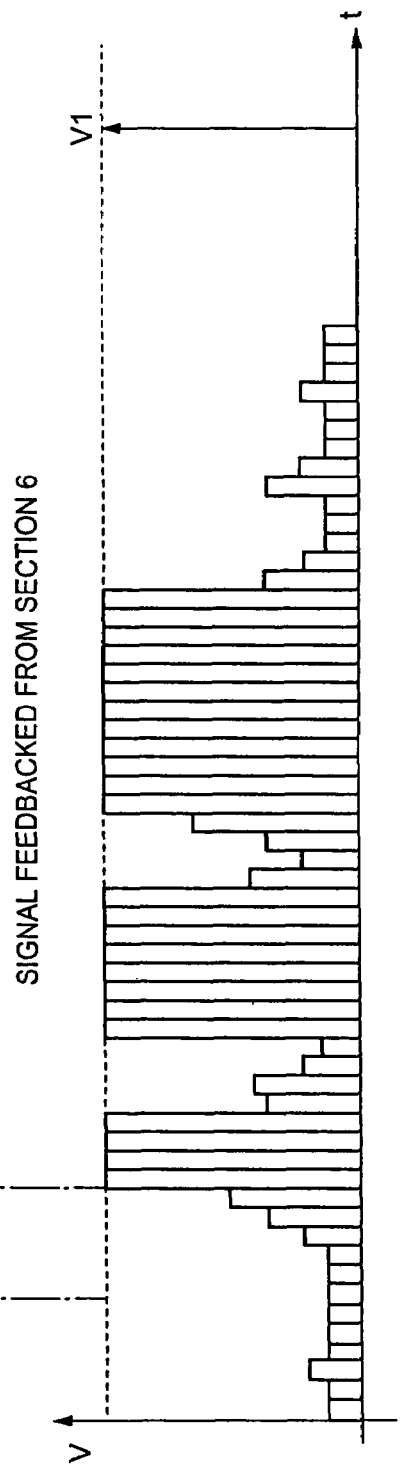

DELAY ADJUSTMENT DEVICE AND METHOD, AND RADIO BASE STATION APPARATUS

BACKGROUND OF THE INVENTION

1. Field of the Invention

The present invention relates to mobile radio communications, and more particularly to a delay adjustment technique for a radio base station apparatus which communicates with mobile communication terminal apparatuses.

2. Description of the Related Art

By taking TCP (Transmission Control Protocol) communication between a radio base station apparatus and a mobile communication terminal apparatus as an example, location service will be described. In TCP communication, RTT (Round Trip Time) is determined based on the following information (a) and (b);

(a) Arrival time of a down link signal transmitted from a radio base station apparatus to a mobile communication terminal apparatus.

(b) Arrival time of an ACK (Acknowledgement) signal of an up link signal transmitted from a mobile communication terminal apparatus to a radio base station apparatus. Based on the determined RTT, retransmission timer value for ACK is determined, or location identification is performed.

RTT is only the period of time for an IP packet to travel back to forth between TCP end points. RTT doesn't include the delay that the radio base station apparatus cause within its circuits. Any delay adjustment based on RTT doesn't exactly adjust the delay introduced by radio base station apparatus circuits Thus, the delay that the radio base station apparatus circuits introduce also must be adjusted particularly. The delay adjustment for the radio base station apparatus is made based on the delay time observed within the radio base station apparatus.

Conventionally, the delay of the radio base station apparatus is usually adjusted using tester, etc. for transmitter with following procedures;

Measurement of the deviation of delay time.

Adjustment a delay adjuster circuit of the radio base station apparatus.

Above conventional way of delay adjustment is performed manually. And measuring instrument or device is required, thus posing a problem.

Moreover conventional way of delay adjustment must be performed when the radio station apparatus is not in service;

Installation time of the radio base station apparatus.

Maintenance time of the radio base station apparatus for readjustment the change of delay due to aging.

Thus causing a further problem.

Several methods have been hitherto proposed to solve the problems.

For example, in Japanese Patent Laid-Open No. 2003-258694, there is disclosed a method for delay adjustment. Specifically, the changing patterns of amplitude level are compared between the input and output signal waves of the radio apparatus to thereby detect a corresponding timing-difference. Then, a control is performed so that the radio apparatuses of a diversity configuration have the same timing difference. In the radio apparatus according to the above invention, this control eliminates the difference of transmission delay time between the radio apparatuses of a diversity configuration.

In Japanese Patent Laid-Open No. 2002-374193, there is disclosed a delay control technique. Specifically, in a radio apparatus according to the above invention, a transmit diversity delay control is performed by employing TSTD (Time Switch Transmit Diversity) including system 0 with a transmitting and receiving function and system 1 with a transmitting and receiving function.

In Japanese Patent Laid-Open No. 2003-158774, there is disclosed a W-CDMA radio base station and a delay time difference elimination method in which the delay time difference between transmitter system 0 and transmitter system 1 of a transmit diversity configuration is automatically corrected.

In Japanese Patent Laid-Open No. 9-214467, there is disclosed a configuration in which the measurement and adjustment of propagation delay are periodically performed during a idle time in which a call is not made; during call, a closed-loop control for delay equalization is performed by using CDMA transmission of a subscriber unit to thereby compensate for small fluctuations of delay time.

However, in a system in which the same frequency is used by plural users, such as CDMA (Code Division Multiple Access), a scheme is used to multiplex plural signals with respective codes to thereby use frequency more efficiently. In the system in which such scheme is used, the amplitude change of outputted signals is rapid and sharp, making it difficult to accurately compare the change patterns of, amplitude level between the two signal waves. In addition, transmission power in CDMA communication has a large peak level; therefore, to reduce distortions introduced in high-power amplifier device of analog stage, signal level is limited typically in digital stage before the signal is converted from digital signal into analog signal and fed into analog stage. Due to the amplitude limitation processing, the peak value is rounded up. Consequently, it can be difficult to identify the peak point.

SUMMARY OF THE INVENTION

The invention disclosed in the present application is outlined below.

A radio base station according to one aspect of the present invention includes a data control section and a delay control section.

The data control section generates and spreads a delay adjustment signal, multiplexes the spread delay adjustment signal with a spread signal of a main signal, and outputs the multiplexed signal. The delay control section receives the multiplexed signal of the delay adjustment signal and main signal from the data control section, receives a feedback signal of a transmitting signal from a radio frequency section, and compares the multiplexed signal with the feedback signal to thereby calculate a delay adjustment value. The delay adjustment section delays signal from the data control section by the time based on the delay adjustment value calculated by the delay control section. The delay adjustment section supplies the delayed signal to the radio frequency section.

The radio base station apparatus according to the present invention may have a configuration in which the data control section generates the delay adjustment signal when number of multiplex are reached to predetermined number and/or total power of transmitted signal are reached to predetermined fix level.

The radio base station apparatus according to the present invention may have a configuration in which the delay adjustment signal has a predetermined fixed amplitude change pattern.

A radio base station apparatus according to another aspect of the present invention includes an information monitoring section and at least one transmitter section.

The information monitoring section monitors an operation status of the transmitter section to control the transmitter section in accordance with the operation status.

The transmitter section includes a data control section, a delay adjustment section, a radio frequency section, and a delay control section.

The data control section spreads main signals and an adjustment signal. The data control section multiplexes spread main signals with a spread adjustment signal. The delay adjustment section adjusts a delay of the multiplexed signal. The radio frequency section receives the signal from the delay adjustment section, and outputs it to an antenna. The delay control section compares the signal outputted from the data control section with a transmitting signal outputted from the radio frequency section to thereby calculate a transmission delay time, and outputs an adjustment value to the delay adjustment section.

In the present invention, the information monitoring section may monitor at least a transmitting power of the transmitter section. Also, in the present invention, the information monitoring section may monitor at least an absolute delay time of the transmitter section to adjust the transmission delay time within the radio base station apparatus.

A radio base station apparatus according to another aspect of the present invention includes one or more transmitter section (11 to 1n), and an information monitoring section (2). The transmitter section (11 to 1n) includes a data control section (4), a delay adjustment section (5), a radio frequency section (6), and a delay control section (3).

The data control section (4) of the transmitter section supplies at least the current transmitting power information to the information monitoring section (2). Based on the transmitting power information received from the data control section (4) of the transmitter section (11 to 1n), the information monitoring section (2) supplies the transmitter section (11 to 1n) with prescribed amplitude information and code information. The data control section (4) of the transmitter section has means for generating an adjustment signal based on the information from the information monitoring section (2), spreading the adjustment signal, multiplexing the spread adjustment signal with a spread signal of a main signal, and outputting the multiplexed signal. The signal (a multiplexed signal of the spread adjustment signal and main signal) outputted from the data control section (4) is inputted to the delay adjustment section (5). The delay adjustment section (5) variably sets and controls a delay time according to an adjustment value supplied from the delay control section (3). An output signal from the delay adjustment section (5) is inputted to the radio frequency section (6). The radio frequency section of the transmitter section (11 to 1n) outputs a transmitting signal adjusted by the delay adjustement section via an antenna (21 to 2n), and at the same time outputs the transmitting signal as a feedback signal to the delay control section (3). The delay control section (3) compares the signal from the data control section with the feedback signal from the radio frequency section to thereby calculate a delay time, and outputs the adjustment value to the delay adjustment section (5).

The data control section (4) of the transmitter section (11 to 1n) according to the present invention includes a main signal control section (41), a spreading section (421 to 42n), an adjustment signal control section (45), another spreading section (46), and an adding and combining section (44).

An output of the main signal control section is inputted to the spreading sections (421 to 42n). An output of the adjustment signal control section is inputted to the another spreading section (46). The adding and combining section (44) adds and combines outputs of the plural spreading sections. The main signal control section (41) manages at least one of the number of users, transmitting power, and code information, which are assigned to the transmitter section. Based on the managed information, the main signal control section (41) supplies the current value of total transmitting power and unused code information to the information monitoring section (2). Based on the information received from the main signal control section (41) of the data control section (4) of the transmitter section (11 to 1n), the information monitoring section (2) supplies the prescribed amplitude information and code information to the adjustment signal control section (45) of the data control section (4). In the transmitter section, the adjustment signal control section (45) of the data control section (4) generates the adjustment signal. The adjustment signal from the adjustment signal control section (45) is spread by the spreading section (46). The spread signal is multiplexed with the main signal by the adding and combining section (44). In the delay adjustment section (5), the output signal from the data control section (4) is subjected to the control of delay time according to the adjustment value supplied by the delay control section (3), and then is inputted to the radio frequency section (6).

The radio frequency section (6) converts the frequency and power of the signal received from the delay adjustment section (5) to those appropriate for transmission, and outputs the resultant signal as a radio wave via the antenna. At the same time, the radio frequency section (6) outputs the feedback signal to the delay control section via a coupler. The delay control section (3) compares the signal from the data control section with the signal from the radio frequency section to thereby calculate the delay time.

According to the present invention, the delay control section (3) includes a waveform shaping unit (31), a divider unit (32), and an adjustment value calculation unit (33). A signal from the data control section (4) is inputted to the divider unit (32). The divider unit (32) outputs the received signal to the adjustment value calculation unit (33) and waveform shaping unit (31). A signal from the radio frequency section is inputted to the waveform shaping unit (31). The waveform shaping unit (31) performs the waveform shaping of the signal from the radio frequency section based on information from the divider unit (32). The waveform-shaped signal is inputted to the adjustment value calculation unit (33). The adjustment value calculation unit (33) calculates the delay time.

According to the present invention, the adjustment value calculation unit (33) includes a waveform comparator unit (34), a delay value offset section (35), and a memory section (36). The waveform comparator unit (34) compares an output signal of the divider unit (32) with an output signal of the waveform shaping unit (31) to thereby calculate the delay time. The memory section (36) saves the calculated absolute delay time, and at the same time supplies the information to the information monitoring section (2). According to an instruction from the information monitoring section, the delay value offset section (35) variably controls a delay offset value with respect to the absolute delay time calculated by the waveform comparator unit. The waveform comparator unit (34) compares the waveform of the multiplexed signal from the data control section with that of the signal feedbacked from the radio frequency section to thereby calculate the absolute delay time, and the calculated delay time is saved into the memory section (36).

According to the present invention, the data saved in the memory section (36) is monitored by the information monitoring section (2). The information monitoring section (2) controls the delay offset value based on the delay value offset information from the information monitoring section (2) to determine the adjustment value to be supplied to the delay adjustment section (5), so that the plural transmitter sections (11 to 1n) have the same transmission delay time for each pair constituting a transmit diversity system.

It will easily be appreciated that the reference numbers in parentheses applied in the above described configuration of the present invention are for understanding well the configuration of the present invention, and do not limit the scope of the present invention.

A method according to another aspect of the present invention is a delay time adjustment method for a radio base station apparatus having a transmitter section including a data control section and a radio frequency section. The method includes: (A) a step in which the data control section generates and spreads a delay adjustment signal, multiplexes the delay adjustment signal with a spread signal of a main signal, and outputs the multiplexed signal; (B) a step in which the multiplexed signal of the delay adjustment signal and main signal from the data control section is compared with a feedback signal of a transmitting signal from the radio frequency section to thereby calculate a delay adjustment value; and (C) a step in which a signal obtained by delaying an output signal from the data control section based on the calculated delay adjustment value is supplied to the radio frequency section.

A method according to another aspect of the present invention is a delay time adjustment method for a radio base station apparatus including an information monitoring section and at least one transmitter section. The method includes: (A) a step in which the information monitoring section monitors an operation status of the transmitter section to control the transmitter section in accordance with the operation status; (B) a step in which the transmitter section receives a control from the information monitoring section, generates a delay time adjustment signal, multiplexes a signal obtained by spreading the delay time adjustment signal with a signal obtained by spreading a main signal, and outputs the multiplexed signal; (C) a step in which a delay of the signal obtained by multiplexing the main signal with the delay time adjustment signal is adjusted by a delay adjustment section; (D) a step in which a radio frequency section receives the delay-adjusted signal and outputs the signal via an antenna; and (E) a step in which the signal obtained by multiplexing the main signal with the delay time adjustment signal is compared with a transmitting signal detected from the radio frequency section to thereby calculate a transmission delay time, and an adjustment value is outputted to the delay adjustment section.

BRIEF DESCRIPTION OF THE DRAWINGS

The above and other objects, features and advantages of the present invention will become more apparent from the following detailed description when taken in conjunction with the accompanying drawings wherein:

FIGS. 4(A) and 4(B) are diagrams to explain a waveform comparison performed by a waveform comparator (34 in FIG. 3) of the delay adjustment section according to the embodiment of the invention.

DETAILED DESCRIPTION OF THE PREFERRED EMBODIMENTS

In order to explain the above described invention further in detail, a embodiment of the present invention will be described below with reference to the accompanying drawings.

Figure 1:
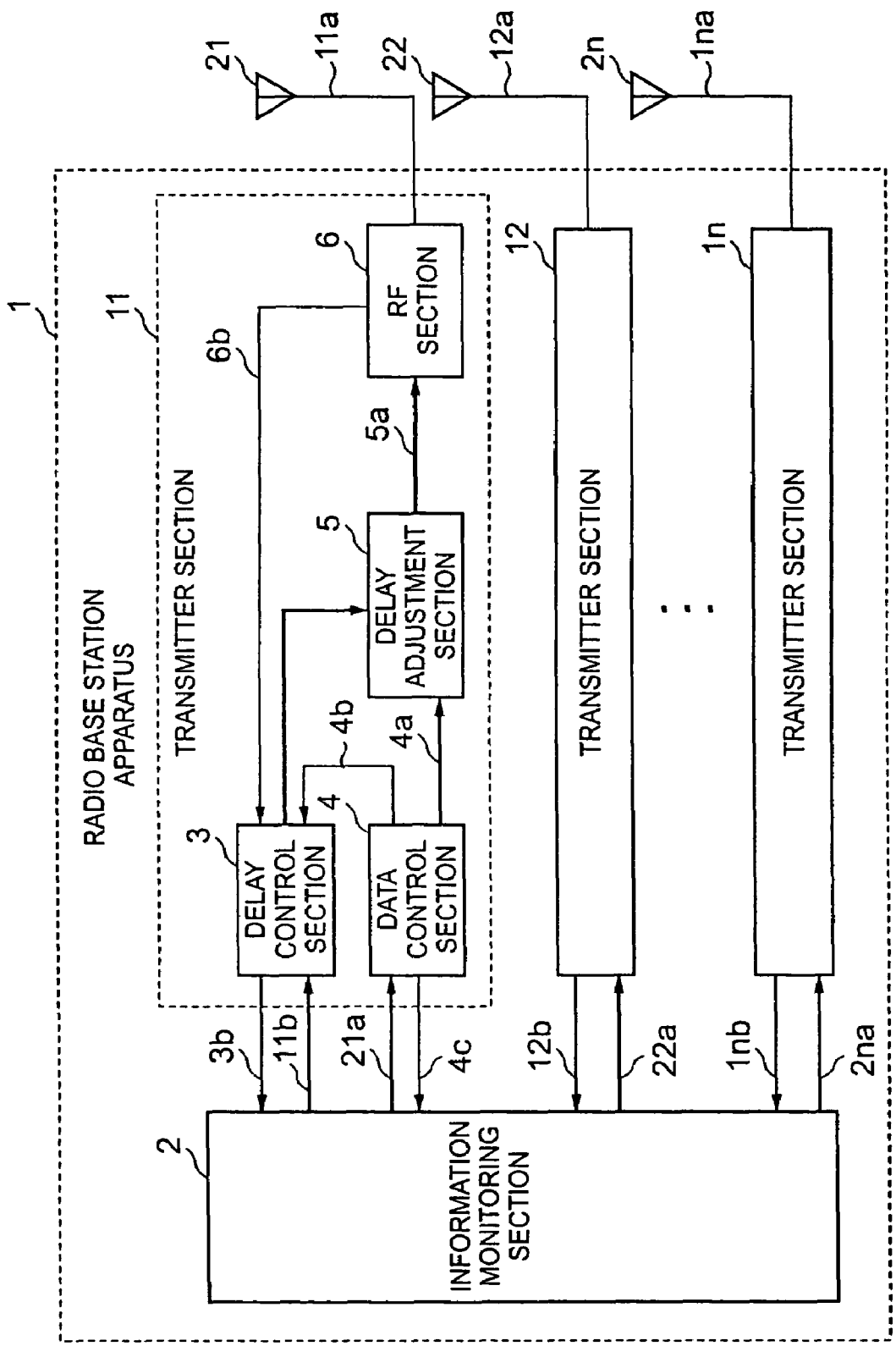
FIG. 1 is a diagram showing a configuration of a radio base station apparatus according to one embodiment of the present invention.

FIG. 1 is a diagram showing a configuration of a radio base station apparatus according to an embodiment of the present invention. Referring to FIG. 1, a radio base station apparatus 1 includes an information monitoring section 2 and a number n of transmitter sections 11, 12 to 1n. Each of the transmitter sections 11 to 1n includes a delay control section 3, a data control section 4, a delay adjustment section 5, and an RF (Radio Frequency) section 6.

Figure 2:
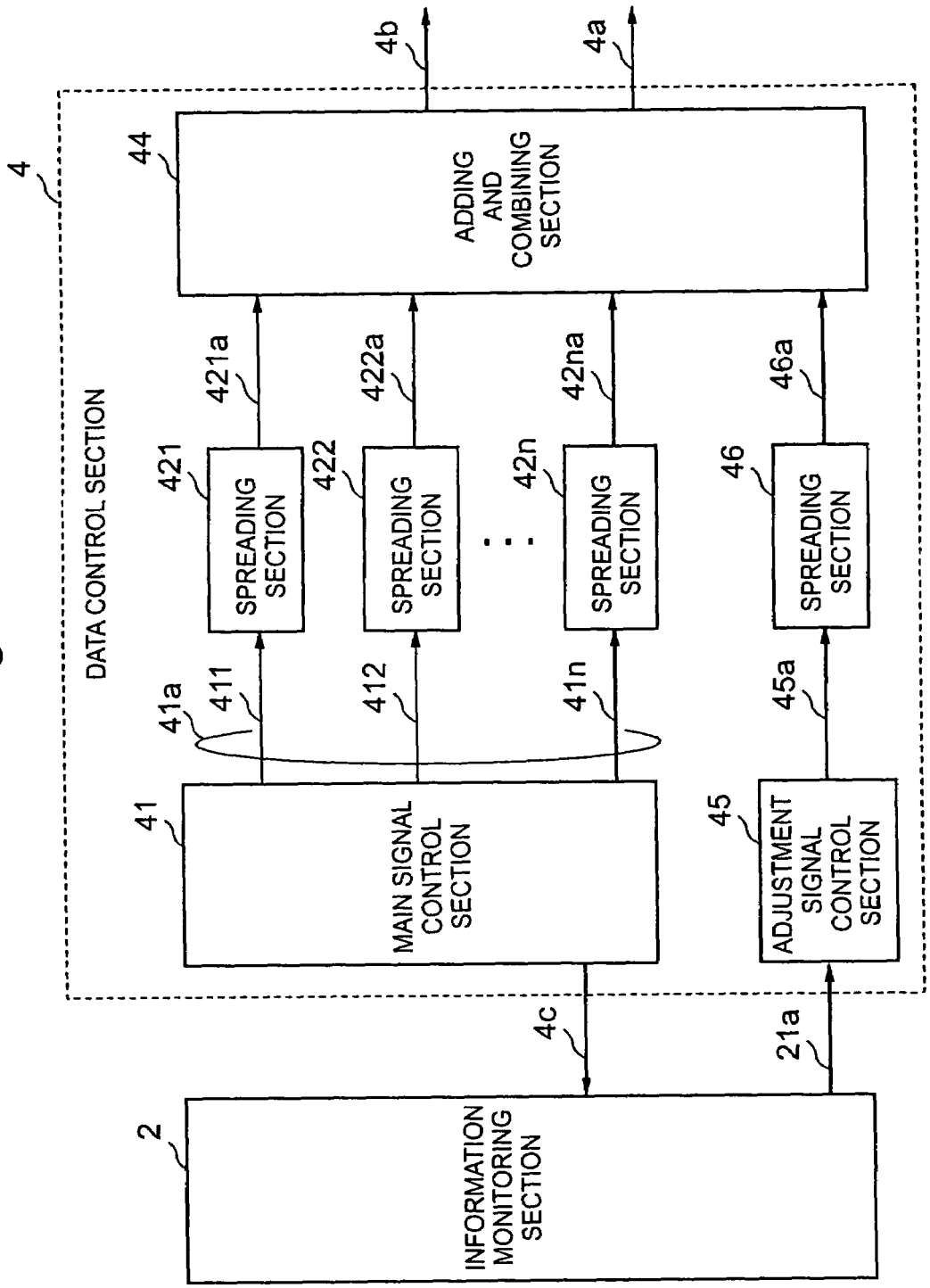
FIG. 2 is a diagram showing an exemplary configuration of a transmitter section (11 in FIG. 1) according to the embodiment of the invention.

FIG. 2 is a diagram showing a configuration of the data control section 4 shown in FIG. 1. Referring to FIG. 2, the data control section 4 includes a main signal control section 41, spreading sections 421 to 42n, an adjustment signal control section 45, and a spreading section 46, and an adding and combining section 44.

The information monitoring section 2 monitors at all times an operation status of the data control section 4 of each of the transmitter sections 11 to 1n. According to the operation status, the information monitoring section 2 controls the adjustment signal control section 45 of the data control section 4. The adding and combining section 44 outputs a multiplexed signal (4a) obtained by multiplexing a spread delay adjustment signal (46a) with spread main signals (421a to 42na). The multiplexed signal (4a) goes through the delay adjustment section 5 and the RF section 6, and is outputted via an antenna element (21 to 2n).

The delay control section 3 compares the signal (4b) multiplexed with the delay adjustment signal in the data control section 4 with a feedback signal (6b) of a transmitting signal detected from the RF section 6 to thereby calculate a transmission delay time. The feedback signal (6b) from the RF section 6 is an analog signal detected immediately before being transmitted via the antenna. In order to compare the feedback signal with the signal (4b), the delay control section 3 converts the signal (6b) into a digital signal through analog-to-digital conversion processing.

With the above described control, it is possible to adjust the transmission delay time within the radio base station apparatus, with the operation status taken into consideration and without interrupting the service. At the same time, a high-precision location detection can be implemented. According to an embodiment, descriptions will be given below.

An embodiment of the present invention will be described below with reference to the accompanying drawings. FIG. 1 is a diagram showing a configuration of an embodiment of the present invention. Referring to FIG. 1, a radio base station apparatus 1 includes an information monitoring section 2 and a number n of transmitter sections 11 to 1n which are monitored by the information monitoring section 2. The number n of transmitter sections 11 to 1n shown in FIG. 1 have the same configuration. An internal configuration is shown only for the transmitter section 11. The transmitter section 11 includes a delay control section 3, a data control section 4, a delay adjustment section 5, an RF section 6, and an antenna element 21.

The information monitoring section 2 monitors the operation status of the transmitter sections 11 to 1n, and according to the operation status, controls a data control section 4 to perform a multiplexing processing of an adjustment signal.

By using signals from the data control section 4 and RF section 6, the delay control section 3 calculates a delay time adjustment value. Based on the delay time adjustment value calculated by the delay control section 3, the delay adjustment section 5 adjusts a transmission delay time. This adjustment is performed so that the transmitter sections 11 to 1n in the radio base station apparatus 1 have the same transmission delay time value.

The delay-adjusted data 5a from the delay adjustment section 5 is inputted to the RF section 6. The signal inputted to the RF section 6 is converted into an analog data, and then the frequency of the signal is up-converted into a frequency band used for transmission. After the up-conversion, the signal is divided into a modulating signal (11a) transmitted as a radio wave via the antenna element 21 and a signal (6b) used in the delay control section 3.

The RF section 6 includes a digital-to-analog converter (DAC) (not shown), a mixer (a circuit having a local oscillator and a phase shifter, and generating a quadrature-modulated signal by use of a mixer), a band-pass filter (BPF), an amplifier, an AGC (Auto Gain Control) amplifier, and a coupler. The RF section has a known configuration in which the received signal is processed in the digital-to-analog converter (DAC), mixer, band-pass filter (BPF) and amplifier in this order, and then is outputted via the antenna.

FIG. 2 is a diagram showing a configuration of the data control section 4. The data control section 4 includes a main signal control section 41, spreading sections 421 to 42n and 46, an adding and combining section 44, and an adjustment signal control section 45.

The current operation information 4c is at all times supplied as information from the main signal control section 41 to the information monitoring section 2. Based on the information (the current operation information 4c), the information monitoring section 2 outputs control information 21a to the adjustment signal control section 45, whereby the transmission delay time is controlled in the transmitter section 11.

Data (411 to 41n and 45a) received from the main signal control section 41 and adjustment signal control section 45 are inputted to the spreading sections 421 to 42n and 46, respectively. Spread data (421a to 42na and 46a) received from the spreading sections 421 to 42n and 46) are inputted to the adding and combining, section 44 to be multiplexed.

The multiplexed data (4a) from the adding and combining section 44 is inputted to the delay adjustment section 5, and the multiplexed data (4b) is also inputted to the delay control section 3.

Figure 3:
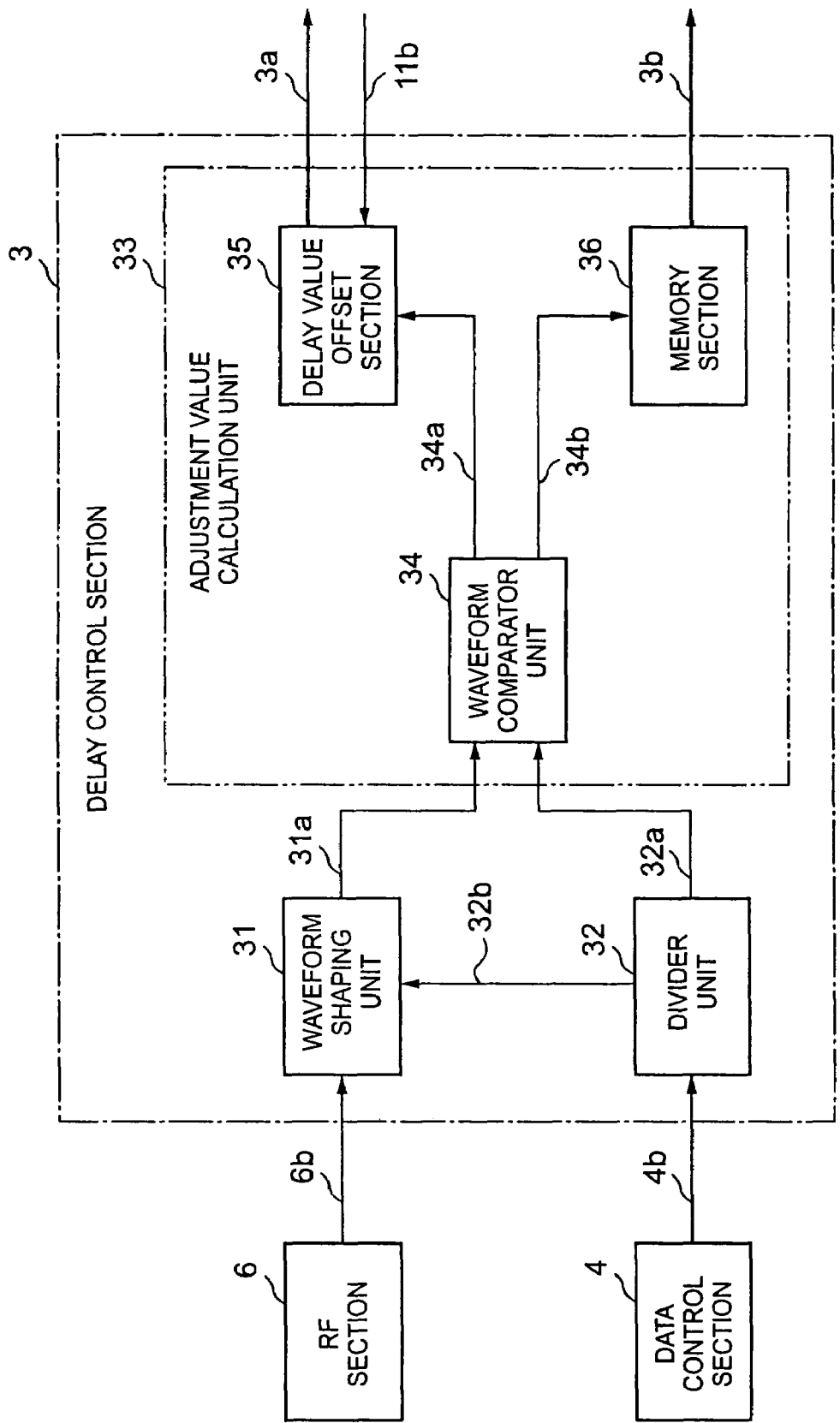
FIG. 3 is a diagram showing an exemplary configuration of a delay adjustment section (5 in FIG. 1) according to the embodiment of the invention.

FIG. 3 is a diagram showing a configuration of the delay control section 3 shown in FIG. 1. The delay control section 3 includes a waveform shaping unit 31, a divider unit 32, and a adjustment value calculation unit 33.

The waveform shaping unit 31 performs an analog-to-digital conversion of a signal (6b) received from the RF section 6, and shapes the waveform. The divider unit 32 divides the multiplexed signal received from the data control section 4. The adjustment value calculation unit 33 calculates a delay time introduced by a signal path from the data control section 4 to the RF section 6 to supply a delay time adjustment value.

The adjustment value calculation unit 33 includes a waveform comparator unit 34, a delay value offset section 35, and a memory section (36). The waveform comparator unit 34 compares a signal sent from the RF section 6 (i.e. an output signal 31a from the waveform shaping unit 31) with a signal sent from the data control section 4 (i.e. an output signal 32a from the divider unit 32). Based on a value obtained from the comparison, the delay value offset section 35 supplies an adjustment value 3a used to control the delay adjustment section 5. The memory section 36 stores the delay time information of the transmitter section 11. Also, the memory section 36 has a function of outputting transmission delay information 11b to the information monitoring section 2.

The present invention is applied to a transmitter section of the radio base station apparatus 1 using CDMA technique.

As shown in FIG. 1, the radio base station apparatus 1 has a number n (n: an integer of 2 or more) of antenna elements 21 to 2n. The antennas has a transmit diversity configuration for each pair. According to the present embodiment, the transmitter sections 11 and 12 constitute a transmit diversity system.

The information monitoring section 2 has a function of integrally monitoring the operation status of each transmitter section 11 to 1n to collect a total transmitting power value (4c) and transmission delay time information (11b) to thereby control the delay control section 3 and data control section 4.

In CDMA, a scheme is used that multiplexing plural signals with respective codes to use radio frequency resources more efficiently.

In the data control section 4 of the-transmitter section 11, each user data (411 to 41n) assigned by the main signal control section 41 is supplied to each spreading section 421 to 42n, is subjected to a coding processing, and then is subjected to a multiplex processing in the adding and combining section 44.

The multiplexed data (4a) goes through the delay adjustment section 5, is inputted to the RF section 6, and is subjected to a D/A conversion. Then, the frequency and power of the data signal is processed for transmission, and the resultant signal is transmitted via the antenna 21.

In this case, the multiplexed data (4a) thus outputted can have a large peak value according to the combined data. To reduce distortions introduced in high-power amplifier device of analog stage, signal level is limited in digital stage before the signal is converted from digital into analog and supplied into analog stage.

Due to the amplitude limitation processing, the peak value is-rounded up to the amplitude limitation value. Consequently, it can be difficult to identify the peak point. In addition, the probability of peak generation varies according to the combination of coded data, modulation method, and amplitude limitation method. Consequently, it can be more difficult to identify the peak point.

Accordingly, in the present embodiment, the following control is employed to solve the above problems.

The main signal control section 41 shown in FIG. 2 manages the number of users, transmitting power, code, etc, each of which are assigned to the transmitter section 11. The main signal control section 41 supplies the current value of total transmitting power and unused code information to the information monitoring section 2. Based on the information, the information monitoring section 2 supplies prescribed amplitude information and code information to the adjustment signal control section 45. Based on the supplied code information, the adjustment signal control section 45 generates a adjustment signal.

As shown in FIG. 4, the adjustment signal has a specific waveform pattern.

According to an instruction from the information monitoring section 2, the adjustment signal control section 45 outputs a predetermined signal to the spreading section 46. The adding and combining section 44 multiplexes the spread main signals 421a to 42na with the spread signal 46a.

An example of the information exchange between the information monitoring section 2 and data control section 4 is as follows. The information monitoring section 2 receives the total-transmitting power information (4c) as one of the input signals from the data control sections 4, and monitors the value. When the total transmitting power is 40% relative. to the prescribed maximum transmitting power, the information monitoring section 2 supplies to the adjustment signal control section 45 of the data control section 4 an instruction such that the adjustment signal control section 45 outputs a signal having a specific waveform pattern, so that the transmitting power corresponding to the remaining 60% or so is assigned.

Similarly to the case of the other main signals, a code is also assigned to this signal. With such code assignment, the multiplexed signal outputted from the adding and combining section 44 looks similar to an ordinary signal obtained by multiplexing signals of a number n of users. Accordingly, it is possible to transmit this signal as a radio wave via the antenna element without having any influence on the operation status.

At the time when the total transmitting power of the main signal is smaller than the prescribed maximum transmitting power, the information monitoring section 2 sends the instruction to cause the adjustment signal to be outputted. Accordingly the amplitude fluctuations of the adjusted signal having specific pattern becomes predominant in outputted signal. Thus, the waveform comparison performed when the transmission delay time is calculated is made easy.

The signal 4a is outputted from the data control section 4 to the delay adjustment section 5. The delay adjustment section 5 controls the delay time of the inputted signal 4a with an accuracy of ¼ chips or more according to the adjustment value supplied from the delay control section 3, and outputs the resultant signal to the RF section 6.

The RF section 6 converts the digital data into an analog signal. In the RF section 6, the frequency and power of the converted analog signal is converted for transmission, and then is outputted as a radio wave via the antenna element 21. In addition, the RF section 6 has a function of outputting the feedback signal 6b to the delay control section 3 via the coupler.

The delay control section 3 compares the signal 4b from the data control section 4 with the signal 6b from the RF section 6 to thereby calculate the delay time.

Firstly the signal 4b from the data control section 4 is inputted to the divider unit 32, and then is outputted to the adjustment value calculation unit 33 and waveform shaping unit 31. The signal 6b from the RF section 6 is inputted to the waveform shaping unit 31 (including an analog-to-digital converter and a wave detector), and is converted into digital data, and then, if necessary, is waveform-shaped based on information 32b from the divider unit 32, and is inputted to the adjustment value calculation unit 33.

The feedback signal (6b) of the transmitting signal supplied from the RF section 6 to the waveform shaping unit 31 has a high frequency. Thus, when D/A-converted via the detector, the waveform of the signal can be distorted. Accordingly, there is included a complementary function using the waveform information 32b.

Figure 5A:
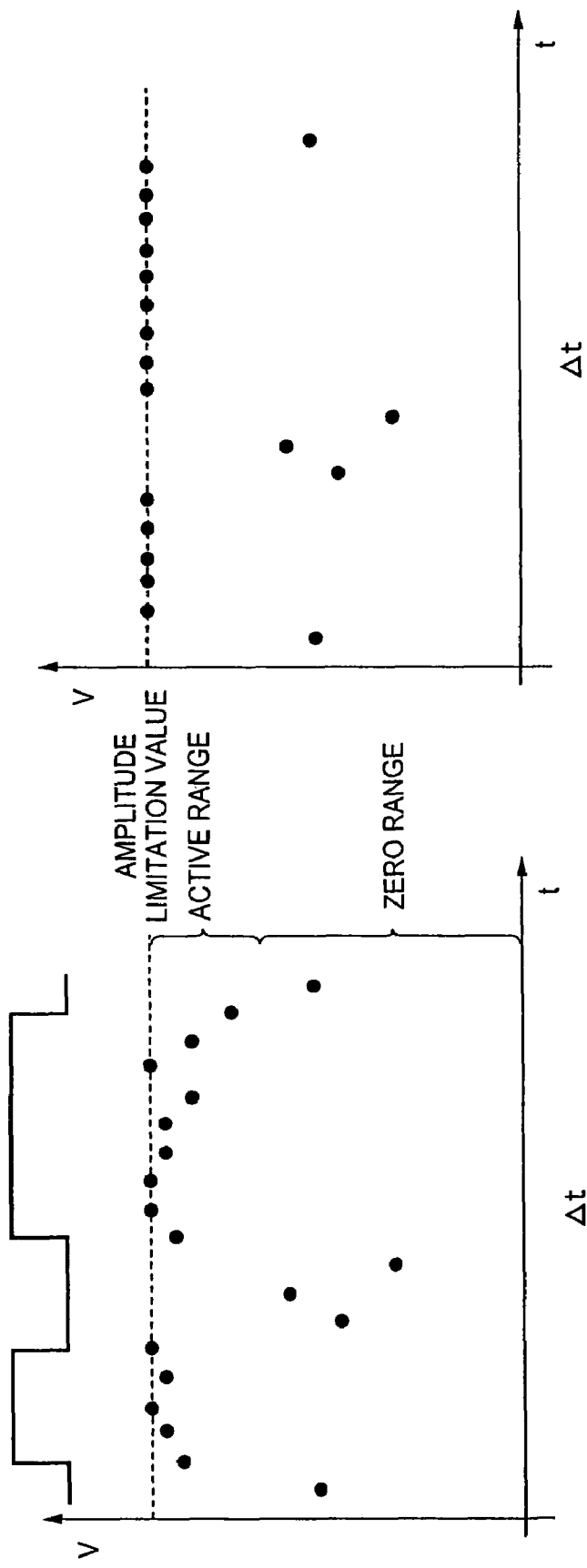
FIGS. 5(A) and 5(B) are diagrams to explain an exemplary use of waveform information in a waveform shaping section (31 in FIG. 3) of the delay adjustment section according to the embodiment of the invention.
Figure 5B:
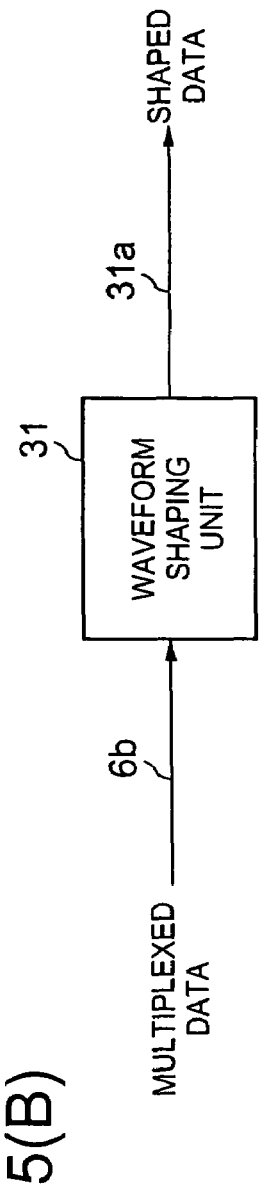

In the waveform shaping unit 31 (refer to FIG. 5(B)), when the waveform is shaped, an active range and a zero range are usually determined by use of a threshold value relative to the detected value. The values included in the active range are raised to a peak value. In practice, however, it is expected that the active range and zero range can not be accurately determined due to the performance of the detector, etc. Thus, the waveform information is used to minimize the error in the determination.

In the adjustment value calculation unit 33, the waveform comparator unit 34 compares the multiplexed signal 32a from the data control section 4 with a signal 31a (a signal obtained by digitalizing the, feedback signal 6b from the RF section 6) to thereby calculate the delay time. The memory section 36 saves a calculated absolute delay time 34b, and at the same time supplies the information to the information monitoring section 2.

According to an instruction from the information monitoring section 2, the delay value offset section 35 controls a delay offset value with respect to the absolute delay time 34a calculated by the waveform comparator unit 34, and outputs the information.

The waveform comparator unit 34 compares the multiplexed signal 32a (refer to FIG. 4(A)) from the data control section 4 with the signal 31a (refer to FIG. 4(B)) obtained by digitalizing the feedback signal 6b from the RF section 6. At this time, a waveform comparison is performed with an accuracy of ¼ chips or more to calculate an absolute delay time Td (refer to FIG. 4). The calculated absolute delay time Td is saved into the memory 36.

The reason why the required accuracy for the delay time calculation is set to ¼ chips or more is as follows; in a transmit diversity configuration, in order to achieve a transmit diversity effect, for example, at a chip rate of 3.84 Mcps (mega chip/sec), the transmission delay time between the antenna elements must be ¼ chips or less.

The data saved in the memory section 36 is monitored by the information monitoring section 2. The information monitoring section 2 controls the delay value offset section 35 of the adjustment value calculation unit 33 based on the delay offset information 21a so that the transmission delay time of each transmitter section 11 to in has the same value for all the transmitter sections or for each pair of the transmitter sections, whereby the information monitoring section 2 determines the adjustment value to be supplied to the delay adjustment section 5.

With this configuration, in coping with the change of transmission delay time caused by temperature change and aging within a radio base station apparatus, the inventive method adjusts the transmission delay time within the radio base station apparatus, with the operation status taken into consideration and without interrupting the service, to thereby make it possible to implement a high-precision location detection.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. A radio base station apparatus comprising:
   a data control section generating and spreading a delay adjustment signal, multiplexing the spread delay adjustment signal with a spread signal of a main signal, and outputting the multiplexed signal; and
   a delay control section receiving the multiplexed signal of the delay adjustment signal and main signal from the data control section, receiving a feedback signal of a transmitting signal from a radio frequency section, and comparing the multiplexed signal with the feedback signal to thereby calculate a delay adjustment value, wherein a signal obtained by delaying the output signal from the data control section based on the delay adjustment value calculated by the delay control section is supplied to the radio frequency section.

2. The radio base station apparatus according to claim 1, wherein
the data control section generates the delay adjustment signal when a predetermined fixed multiplex number and/or transmitting power value are reached.

3. The radio base station apparatus according to claim 1, wherein the delay adjustment signal has a predetermined fixed amplitude change pattern.

4. The radio base station apparatus according to claim 2, wherein the delay adjustment signal has a predetermined fixed amplitude change pattern.

5. A radio base station apparatus comprising an information monitoring section and at least one transmitter section, wherein
the information monitoring section monitors an operation status of the transmitter section to control the transmitter section in accordance with the operation status, and
the transmitter section includes:
a data control section having a spreading section which spreads a delay adjustment signal, a spreading section which spreads a main signal, and a multiplexing section which multiplexes the main signal and delay adjustment signal spread by the respective spreading sections and outputs the multiplexed signal;
a delay adjustment section which adjusts a delay of the multiplexed signal;
a radio frequency section which receives a signal from the delay adjustment section and outputs the signal to an antenna; and
a delay control section which compares the signal obtained by multiplexing the main signal and delay adjustment signal and outputted from the data control section with a feedback signal of a transmitting signal detected from the radio frequency section to thereby calculate a transmission delay time, and outputs an adjustment value to the delay adjustment section.

6. The radio base station apparatus according to claim 5, wherein the information monitoring section monitors at least a transmitting power of the transmitter section.

7. The radio base station apparatus according to claim 5, wherein the information monitoring section monitors at least an absolute delay time of the transmitter section to adjust the transmission delay time within the radio base station apparatus.

8. A radio base station apparatus comprising one or more transmitter sections and an information monitoring section, wherein:
the transmitter section includes a data control section, a delay adjustment section, a radio frequency section, and a delay control section;
the data control section of the transmitter section supplies the number of users, and the current transmitting power and code information to the information monitoring section;
based on the information received from the data control section of the transmitter section, the information monitoring section supplies the transmitter section with prescribed amplitude information and code information;
the data control section of the transmitter section has means for generating a delay adjustment signal based on the information from the information monitoring section, spreading the delay adjustment signal, multiplexing the spread signal with a spread signal of a main signal, and outputting the multiplexed signal;
the signal outputted from the data control section is inputted to the delay adjustment section, which section variably sets and controls a delay time according to a adjustment value supplied from the delay control section;
an output signal from the delay adjustment section is inputted to the radio frequency section, which section outputs a transmitting signal adjusted by the delay adjustment section via an antenna, and at the same time outputs the transmitting signal as a feedback signal to the delay control section; and
the delay control section receives the signal from the data control section and the feedback signal from the radio frequency section, and performs a waveform comparison to thereby calculate a delay time and supplies the adjustment value to the delay adjustment section.

9. The radio base station apparatus according to claim 8, wherein:
the data control section of the transmitter section includes a main signal control section, at least one spreading section which receives an output of the main signal control section, an adjustment signal control section, a spreading section which receives an output of the adjustment signal control section, and an adding and combining section which adds and combines outputs of a plurality of the spreading sections;
the main signal control section manages at least one of the number of users, power, and code information, which are assigned to the transmitter section, and supplies the current value of total transmitting power and unused code information to the information monitoring section;
based on the information received from the main signal control section of the data control section of the transmitter section, the information monitoring section supplies the prescribed amplitude information and code information to the adjustment signal control section of the data control section of the transmitter section;
in the transmitter section, the adjustment signal control section of the data control section generates the delay adjustment signal, the delay adjustment signal being spread by the spreading section and multiplexed with the main signal by the adding and combining section, the signal outputted from the data control section being subjected to the control of delay time according to the adjustment value supplied by the delay control section, and being inputted to the radio frequency section.

10. The radio base station apparatus according to claim 8, wherein:
the radio frequency section converts the frequency and power of the signal received from the delay adjustment section to those appropriate for transmission, outputs the resultant signal as a radio wave via the antenna, and at the same time, outputs the feedback signal to the delay control section via a coupler; and
The delay control section compares the signal from the data control section with the signal from the radio frequency section to thereby calculate the delay time.

11. The radio base station apparatus according to claim 8, wherein:
the delay control section includes a waveform shaping unit, a divider unit, and an adjustment value calculation unit;

a signal from the data control section is inputted to the divider unit, and is outputted from the divider unit to the adjustment value calculation unit and waveform shaping unit;

a signal from the radio frequency section is inputted to the waveform shaping unit, and is subjected to a waveform shaping based on information from the divider unit, and is inputted to the adjustment value calculation unit; and the adjustment value calculation unit calculates the delay time.

12. The radio base station apparatus according to claim 8, wherein:

the adjustment value calculation unit includes a waveform comparator unit, a delay value offset section, and a memory section;

the waveform comparator unit compares an output signal of the divider unit with an output signal of the waveform shaping unit to thereby calculate the delay time, the memory section saves the calculated absolute delay time, and supplies the information to the information monitoring section;

the delay value offset section variably controls a delay offset value according to an instruction from the information monitoring section, with respect to the absolute delay time calculated by the waveform comparator unit; and the waveform comparator unit compares the waveform of the multiplexed signal from the data control section with that of the signal feedbacked from the radio frequency section to thereby calculate the absolute delay time, the calculated absolute delay time being saved into the memory section.

13. The radio base station apparatus according to claim 10, wherein the data saved into the memory section is monitored by the information monitoring section, the delay offset value being controlled based on the delay value offset information from the information monitoring section to determine the adjustment value to be supplied to the delay adjustment section so that a plurality of the transmitter sections have the same transmission delay time for each pair constituting a transmit diversity system.

14. A delay time adjustment device for a radio base station apparatus, comprising an information monitoring section and at least one transmitter section, the information monitoring section monitoring an operation status of the transmitter section to control the transmitter section in accordance with the operation status, the transmitter section including a radio frequency section and a data control section which generates and spreads a delay adjustment signal, spreads a main signal, multiplexes the spread main signal and delay adjustment signal, and outputs the multiplexed signal, the delay time adjustment device including: a delay adjustment section which adjusts a delay of a signal from the data control section; and a delay control section which receives and compares the signal obtained by multiplexing the main signal and delay adjustment signal, and outputted from the data control section, and a feedback signal of a transmitting signal outputted from the radio frequency section which receives a signal from the delay adjustment section and outputs the signal to an antenna, to thereby calculate a transmission delay time to output an adjustment value to the delay adjustment section.

15. The delay time adjustment device according to claim 14, wherein:

the delay control section includes a waveform shaping unit, a divider unit, and an adjustment value calculation unit;

a signal from the data control section is inputted to the divider unit, and is outputted from the divider unit to the adjustment value calculation unit and waveform shaping unit;

a signal from the radio frequency section is inputted to the waveform shaping unit, and is subjected to a waveform shaping based on information from the divider unit, and is inputted to the adjustment value calculation unit; and the adjustment value calculation unit calculates the delay time.

16. The delay time adjustment device according to claim 15, wherein:

the adjustment value calculation unit includes a waveform comparator unit, a delay value offset section, and a memory section;

the waveform comparator unit compares an output signal of the divider unit with an output signal of the waveform shaping unit to thereby calculate the delay time;

the memory section saves the calculated absolute delay time, and supplies the information to the information monitoring section;

the delay value offset section variably controls a delay offset value with respect to the absolute delay time calculated by the waveform comparator unit; and the waveform comparator unit compares the waveform of the signal multiplexed by the data control section with that of the signal feedbacked from the radio frequency section to thereby calculate the absolute delay time, the calculated absolute delay time being saved into the memory section.

17. The delay time adjustment device according to claim 16, wherein the data saved into the memory section is monitored by the information monitoring section, the delay offset value being controlled based on the delay value offset information from the information monitoring section to determine the adjustment value to be supplied to the delay adjustment section so that a plurality of the transmitter sections have the same transmission delay time for each pair constituting a transmit diversity system.

18. A delay time adjustment method for a radio base station apparatus having a transmitter section including a data control section and a radio frequency section, the delay time adjustment method comprising the steps of:

generating and spreading a delay adjustment signal, multiplexing the spread delay adjustment signal with a spread signal of a main signal, and outputting the multiplexed signal;

comparing the multiplexed signal of the delay adjustment signal and main signal with a feedback signal of a transmitting signal from the radio frequency section to thereby calculate a delay adjustment value; and supplying a signal obtained by delaying an output signal from the data control section based on the calculated delay adjustment value to the radio frequency section.

19. The delay time adjustment method for a radio base station apparatus according to claim 18, wherein said generating is performed when a predetermined fixed multiplex number and/or transmitting power value are reached.

20. The delay time adjustment method for a radio base station apparatus according to claim 18, wherein the delay adjustment signal has a predetermined fixed amplitude change pattern.

21. The delay time adjustment method for a radio base station apparatus according to claim 19, wherein the delay adjustment signal has a predetermined fixed amplitude change pattern.

22. A delay time adjustment method for a radio base station apparatus, the delay time adjustment method comprising the steps of:
- monitoring an operation status of transmission to control transmission in accordance with the transmission status;
- receiving a control signal, generating a delay time adjustment signal, multiplexing a signal obtained by spreading the delay time adjustment signal with a signal obtained by spreading a main signal, and outputting the multiplexed signal;
- adjusting a delay of the signal obtained by multiplexing the main signal with the delay time adjustment signal;
- receiving the delay-adjusted signal and outputting the signal via an antenna; and
- comparing the signal obtained by multiplexing the main signal with the delay time adjustment signal with a signal being transmitted by the radio base station to thereby calculate a transmission delay time to output an adjustment value.

23. The delay time adjustment method according to claim 22, wherein said status includes at least a transmitting power.

24. The delay time adjustment method for a radio base station apparatus according to claim 22, wherein said status includes at least an absolute delay time of the signal being transmitted by the radio base station to adjust a transmission delay time within the radio base station apparatus.

* * * * *